United States Patent
Vaughn et al.

(10) Patent No.: US 9,302,246 B2
(45) Date of Patent: Apr. 5, 2016

(54) MITIGATING LEACHING OF ARSENIC AND ANTIMONY FROM ACTIVATED CARBON

(71) Applicant: CALGON CARBON CORPORATION, Pittsburgh, PA (US)

(72) Inventors: Robert H. Vaughn, Bethel Park, PA (US); Rebecca L. Distefano, McDonald, PA (US)

(73) Assignee: Calgon Carbon Corporation, Pittsburgh, PA (US)

( * ) Notice: Subject to any disclaimer, the term of this patent is extended or adjusted under 35 U.S.C. 154(b) by 17 days.

(21) Appl. No.: 13/842,818

(22) Filed: Mar. 15, 2013

(65) Prior Publication Data
US 2013/0284673 A1    Oct. 31, 2013

Related U.S. Application Data

(60) Provisional application No. 61/638,285, filed on Apr. 25, 2012.

(51) Int. Cl.
*C02F 1/28* (2006.01)
*B01J 20/30* (2006.01)
*B01J 20/20* (2006.01)
*C02F 1/66* (2006.01)

(52) U.S. Cl.
CPC .............. *B01J 20/3071* (2013.01); *B01J 20/20* (2013.01); *B01J 20/3085* (2013.01); *C02F 1/281* (2013.01); *C02F 1/283* (2013.01); *C02F 1/66* (2013.01)

(58) Field of Classification Search
USPC ................... 210/660, 689; 502/416, 426, 427
See application file for complete search history.

(56) References Cited

U.S. PATENT DOCUMENTS

| | | | |
|---|---|---|---|
| 4,267,057 A * | 5/1981 | Hager et al. ................... | 210/678 |
| 4,390,698 A * | 6/1983 | Chiovini et al. ............... | 544/274 |
| 5,368,738 A * | 11/1994 | Dussert et al. ................ | 210/660 |
| 5,770,090 A * | 6/1998 | Lewis, III ...................... | 210/662 |
| 5,876,607 A * | 3/1999 | Farmer et al. ................. | 210/681 |
| 6,946,077 B2 * | 9/2005 | Roodman et al. ............. | 210/679 |
| 2008/0073290 A1 * | 3/2008 | Ryan et al. .................... | 210/749 |
| 2009/0294326 A1 * | 12/2009 | Miller et al. .................... | 208/44 |

FOREIGN PATENT DOCUMENTS

| | | |
|---|---|---|
| JP | 08-141553 A | 6/1996 |
| JP | 04272586 B2 | 6/2009 |
| WO | WO 02-058813 A1 | 8/2002 |

OTHER PUBLICATIONS

International Search Report dated Aug. 19, 2013 for PCT/US2013/037980.

\* cited by examiner

*Primary Examiner* — Chester Barry
(74) *Attorney, Agent, or Firm* — Pepper Hamilton LLP

(57) ABSTRACT

Activated carbon having a low contact pH and their use in the purification of water, as well as methods for making such low contact pH activated carbon and filters and methods for purifying water are described herein. The methods for preparing such low contact pH activated carbons provides an effective and less costly means for preparing activated carbons for purification processes.

15 Claims, No Drawings

MITIGATING LEACHING OF ARSENIC AND ANTIMONY FROM ACTIVATED CARBON

CROSS-REFERENCE TO RELATED APPLICATIONS

The application claims priority to U.S. Provisional No. 61/638,285, entitled "Mitigating Leaching of Arsenic and Antimony by Adjusting Bulk pH of the Carbon" filed Apr. 25, 2012, which is hereby incorporated by reference in its entirety.

GOVERNMENT INTERESTS

Not applicable

PARTIES TO A JOINT RESEARCH AGREEMENT

Not applicable

INCORPORATION BY REFERENCE OF MATERIAL SUBMITTED ON A COMPACT DISC

Not applicable

BACKGROUND

Activated carbon is commonly used in the drinking water industry for the removal of a variety of contaminants including, for example: chlorinated, halogenated organic compounds (such as trihalomethanes), adsorbable organic halogens (AOX), odorous materials, colored contaminants, compounds for biological treatment systems, aromatics, pesticides, and the like. This purification is simply accomplished through direct contact of the contaminated water with the activated carbon. Almost all commercially available activated carbon contains ppm levels of arsenic and antimony, originating from the natural composition of raw materials from which said activated carbon is produced. When directly contacted with the water, activated carbon may leach small fractions of said arsenic and antimony in the form of soluble oxy-anions, at ppm levels. Albeit miniscule, leaching is nevertheless undesirable, but is known to be reduced by subjecting said activated carbon to acid washing in a separate procedure prior to utilizing the activated carbon for water purification. Acid washing strips away the majority of the leachable fractions of said arsenic and antimony.

Acid washing procedures may contain several steps, typically including neutralization with a mild base solution followed by final water rinsing to remove resulting salts from said activated carbon. Typically, the amount of neutralizing agent, such as sodium carbonate, is controlled to provide a neutral or slightly basic pH of said final rinse water. The neutral or slightly basic pH of said final rinse water provides a contact pH of final acid washed product, after drying, that approaches a contact pH of 9 to 11. Embodiments described herein are useful for providing reduction in leachable arsenic and antimony in activated carbon for filtration, said reduction exceeding that achieved by typical acid washing.

SUMMARY OF THE INVENTION

Various embodiments are directed to compositions including activated carbon having a contact pH of about 5.0 to about 8.5 and, in some embodiments, a contact pH of about 6.5 to about 8.0. The activated carbon of such embodiments can be derived from any source of carbon including, but not limited to, bituminous coal, sub-bituminous coal, lignite coal, anthracite coal, peat, nut shells, pits, coconut, babassu nut, macadamia nut, dende nut, peach pit, cherry pit, olive pit, walnut shell, wood, polymers, resins, petroleum pitches, and combinations thereof, and in certain embodiments, the activated carbon may have a mean particle diameter of about 4 mm to about 0.1 mm. Additional embodiments are directed to such compositions in combination with activated carbon having a contact pH of greater than 8.0 or neutral activated carbons.

Further embodiments are directed to methods for treating water including the steps of contacting activated carbon having a contact pH of about 5.0 to about 8.5 with water. The step of contacting may be carried out by any means including, but not limited to, flowing water over a bed of the activated carbon, introducing water onto a filter including the activated carbon, introducing the activated carbon into a container for holding water, and combinations thereof. In some embodiments, the methods may include one or more steps such as, for example, filtering the water, disinfecting the water, clarifying the water, adjusting a pH of the water, and combinations thereof. In certain embodiments, the activated carbon may have a contact pH of about 6.5 to about 8.0, and in some embodiments, the activated carbon may have a mean particle diameter of about 4 mm to about 0.1 mm. In further embodiments, the activated carbon may further include a mixture of activated carbon having a contact pH of about 5.0 to about 8.5 and activated carbon having a contact pH of greater than 8.0.

Other embodiments are directed to methods for producing activated carbon including the steps of washing activated carbon in acid and rinsing the activated carbon in rinse water until the rinse water attains pH of about 1.0 to about 3.0. In some embodiments, the method may further include partially neutralizing the acid before washing with a pH neutralizer including, but not limited to, sodium hydroxide, sodium carbonate, sodium bicarbonate, potassium hydroxide, potassium carbonate, potassium bicarbonate, and combinations thereof. In various embodiments, the washing in acid may include immersing the activated carbon in an acid such as, but not limited to, hydrochloric acid, sulfuric acid, nitric acid, acetic acid, citric acid, maleic acid, fumaric acid, mono-basic organic acid, di-basic organic acid, and formic acid. In further embodiments, the method may include the step of drying the activated carbon.

DESCRIPTION OF DRAWINGS

Not applicable

DETAILED DESCRIPTION

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention, which will be limited only by the appended claims. Unless defined otherwise, all technical and scientific terms used herein have the same meaning as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference in their entirety. Nothing herein is to be construed as an admission that the invention is not entitled to antedate such disclosure by virtue of prior invention.

It must also be noted that as used herein and in the appended claims, the singular forms "a," "an," and "the" include plural reference unless the context clearly dictates otherwise. Thus, for example, reference to "a filter" is a reference to "one or more filters" and equivalents thereof known to those skilled in the art, and so forth.

As used herein, the term "about" means plus or minus 10% of the numerical value of the number with which it is being used. Therefore, about 50% means in the range of 45%-55%.

Embodiments of the invention are directed to activated carbons for use in water purification and other processes where leaching of metals and, in particular, arsenic and antimony can be problematic, and methods for making such activated carbons. In certain embodiments, these activated carbons may have a low contact pH. Additional embodiments include blends of activated carbon having a low contact pH with activated carbons that are untreated and filters, filter beds, and other apparatuses including low contact pH activated carbon.

The activated carbon of various embodiments may have a low contact pH. The term "contact pH" refers to the pH of a sample of activated carbon after immersion in water. For example, contact pH can be determined by immersing a sample, for example, 25.0 g, of activated carbon in water, for example, about 100 ml, for a period of time from about 5 minutes to about 30 minutes, and determining the pH of the water after immersion. Activated carbon, typically exhibits a contact pH of about 9.0 to about 11.0. The activated carbon of various embodiments of the invention exhibit a contact pH of about 6.5 to about 8.5 about 6.0 to about 8.0, about 5.5 to about 7.5, about 5.0 to about 7.0, or any individual value or range encompassed by these values.

In some embodiments, the activated carbon may have a moisture content of from about 0.1% to about 20%, about 2% to about 17%, about 4% to about 15% or any individual value or range encompassed by these ranges. In some embodiments, the moisture content may be the result of residual moisture from the washing process. For example, after acid washing, the activated carbon may be dried to a particular moisture level. The activated carbon may be derived from any source and may have various sizes, shapes, and pore geometries. In various embodiments, the activated carbon may be prepared from any precursor carbonaceous material known in the art including, but not limited to bituminous coal, sub-bituminous coal, lignite coal, anthracite coal, peat, nut shells, pits, coconut, babassu nut, macadamia nut, dende nut, peach pit, cherry pit, olive pit, walnut shell, wood, polymers, resins, petroleum pitches, and any other carbonaceous material or combinations thereof. Additionally, the carbonaceous material may be derived from activated carbons produced from various precursors that have been in-use and subsequently reactivated and/or regenerated. Following activation, the activated carbon may have a mean particle diameter (MPD) of about 4 mm or less, and in certain embodiments, the activated carbon may have a MPD about 4 mm to about 0.1 mm, about 4.5 mm to about 1.0 mm, about 4.0 µm to about 1.5 mm, about 3.5 mm to about 2.0 µm, or any individual value or range encompassed by these values. Similarly, the pore geometry of the activated carbon may vary among embodiments, and the activated carbons will generally have a distribution of pores including macropores (greater than 50 nm diameter), mesopores (2 nm to 50 nm diameter), and micropores (less than 2 nm diameter). The pore distribution may affect the types of materials that can be adsorbed by the activated carbon. Thus, the activated carbon of certain embodiments may have a wide pore distribution indicating that the pores of each activated carbon particle have various sizes.

The activated carbons of such embodiments may exhibit reduced leaching of metals and other transition elements such as, arsenic and antimony when immersed in water. For example, activated carbons having a contact pH of from about 6.0 to about 8.0 exhibit a ten-fold reduction in arsenic leaching when compared to activated carbons that have been neutralized after acid washing and exhibit a contact pH of about 9 to about 11. Thus, the activated carbon of various embodiments described above may be useful for use in water purification systems, and in particular, water purification systems that are used for purification of drinking water.

Some embodiments are directed to methods for preparing the activated carbons described above. Such methods may generally include the step of activating or reactivating a carbonaceous material, which can be any of the carbonaceous materials described above. Activation can be carried out by any activation means known in the art including steam and chemical activation processes. For example, in some embodiments, the carbonaceous material may be exposed to an oxidizing agent such as carbon dioxide, oxygen, or steam at temperatures above 250° C., for example, about 600° C. to about 1200° C. In other embodiments, the carbonaceous material may be pyrolyzed at temperatures of from about 600° C. to about 900° C., in an inert atmosphere with gases like argon or nitrogen. In still other embodiments, the carbonaceous material may be combined with an acid, strong base, or a salt such as phosphoric acid, potassium hydroxide, sodium hydroxide, calcium chloride, and zinc chloride and then subjected to temperatures of about 450° C. to about 900° C.

After activating, the methods of embodiments may include the step of washing the activated carbon in an acid solution. Acid washing can be carried out using any acid known in the art including, for example, hydrochloric acid, sulfuric acid, nitric acid, acetic acid, citric acid, maleic acid, fumaric acid, mono-basic organic acid, di-basic organic acid, formic acid, and the like, and can be carried out in a solution of about 1% to about 3% acid. Typically, washing in acid is carried out in a vessel. The activated carbon may be washed for any amount of time. For example, in some embodiments, washing can be carried out from about 1 hour to about 16 hours, about 2 hours to about 10 hours, about 3 hours to about 8 hours, or any individual time or time period encompassed by these ranges.

In some embodiments, the method may include the step of neutralizing the pH of the acid washed activated carbon. In such embodiments, neutralization can be carried out by contacting the acid washed activated carbon with a basic solution including a base such as, for example, sodium hydroxide, sodium carbonate, sodium bicarbonate, potassium hydroxide, potassium carbonate, potassium bicarbonate, and the like and combinations thereof. In particular embodiments, contacting can be carried out by immersing the activated carbon in the basic solution, and in other embodiments, contacting may include spraying or flowing the solution onto or over the acid washed activated carbon. In some embodiments, neutralization may be carried out by water washing the acid washed activated carbon, and water washing can be carried out by immersing the activated carbon in water or spraying or flowing water over the activated carbon. In some embodiments, the methods may exclude the step of neutralizing.

In further embodiments, the methods may include rinsing the activated carbon in water after neutralization. Rinsing can be carried out by any means including, for example, immersion, spraying, or flowing water over the neutralized activated carbon. In various embodiments, rinsing may be carried out until the rinse water has a pH of about 1.0 to about 3.0. The pH of the rinse water can be determined by measuring the pH after the water has contacted the activated carbon and, in some embodiments, has reached an ion concentration equilibrium with the neutralized activated carbon.

After washing, the method may include the steps of drying the activated carbon. For example, in some embodiments, the activated carbon can be removed from the vessel and dried under atmospheric conditions. In other embodiments, the activated carbon can be dried by heating, and in some embodiments, drying may be carried out under vacuum. In certain embodiments, the activated carbon may be dried completely to a residual moisture level of about 0.1% to about 1%. In other embodiments, the activated carbon may be dried to a residual moisture level of about 1% to about 20%, about 2% to about 17%, about 4% to about 15% or any individual value or range encompassed by these ranges. The activated carbon prepared by these methods will have a contact pH of about 6.5 to about 8.5, about 6.0 to about 8.0, about 5.5 to about 7.5, about 5.0 to about 7.0, or any individual value or range encompassed by these values. Contact pH can be determined by contacting the dried activated carbon with purified and de-ionized water and after an amount of time, for example, about 5 minutes to about 10 minutes, determining the pH of the water. For comparison, virgin activated carbon or activated carbon that has been acid washed and rinsed until the rinse water is about neutral (i.e., pH of about 7.0) will typically have a contact pH of greater than about 9.0, for example, 8.0 to about 11.0. The activated carbons described above and prepared by the method described above have a contact pH that is significantly lower than the contact pH of virgin activated carbon or activated carbon that has been washed to a neutral rinse water pH, yet the activated carbon of such embodiments provides significantly reduced leaching of arsenic, antimony, or other metals that can contaminate water.

In some embodiments, the methods may further include the step of mixing the low contact pH activated carbon with neutral pH activated carbon. For example, in certain embodiments, activated carbon prepared by the method described above can be combined with activated carbon prepared by a similar method that has been neutralized by, for example, water washing resulting in activated carbon having a pH of about 6.0 to about 9.0. The resulting composition, therefore, includes a mixture of low contact pH activated carbon and neutral pH activated carbon. Without wishing to be bound by theory, compositions including a mixture of low contact pH and neutral pH may exhibit substantially the same reduced metal leaching as compositions including activated carbon having a low contact pH alone.

The mixtures may include any ratio of low contact pH activated carbon to neutral activated carbon. For example, in some embodiments, the ratio of low contact pH activated carbon to neutral activated carbon may be 1:1, 2:1, 3:1, 4:1, 5:1, and the like or 1:2, 1:3, 1:4, 1:5, and the like. Thus, the mixtures of various embodiments may be about 100% low contact pH activated carbon to about 10% low contact pH activated carbon or less, and in some embodiments, the mixtures may be about 90% to about 20%, about 80% to about 25%, about 75% to about 30%, or about 50% low contact pH activated carbon or any percentage or range encompassed by these ranges.

Additional embodiments are directed to filters and methods for purifying water using the low contact pH activated carbons described above. Such embodiments are not limited to particular types of filters. For example, in some embodiments, the filter may be water filter for consumer use, and in other embodiments, the filter may be a commercial water filter for use at, for example, an industrial or municipal water treatment plant.

The consumer filters of various embodiments may have any design and may at least include a housing, including a compartment configured to hold granulated activated carbon and allow water to flow over the activated carbon. Such filters may include various additional components such as, for example, screens or other means for holding the activated carbon in the compartment or additional purification devices such as filtration membranes and the like. In some embodiments, the housing may include various components necessary to allow the filter to be integrated into a device such as a pitcher or bottle device in which water flows from one compartment to another and passes through the filter during transfer, a device that attaches to a water line or faucet that cause water to pass through the filter before being expelled from the faucet or otherwise delivered to a water dispensing device. In particular, the filter may include an inlet port for introducing water into the filter and an outlet port for dispensing the filtered or treated water from the filter. In some embodiments, the filter may include a removable connecting means to connect to a water source such as a sink pipe, hose, tube fittings, faucet, water fountain and the like at the inlet port.

In some embodiments, the filter may include a filter housing having an elongated envelope composed of an inert plastic material such as polyethylene, polypropylene, polyvinylchloride, polytetrafluoroethylene, or any combination thereof disposed within the filter housing for retaining the low contact pH activated carbon or mixture of low contact pH activated carbon and neutral activated carbon. The filter housing and the envelope can be spaced from one another, and in some embodiments, a particulate filter such as, for example, filter paper may be disposed within the space to retain dust associated with the activated carbon. In particular embodiments, additional adsorbents, such as, carbon cloth may be disposed within the space. In some embodiments, the filter may include a perforated plate, slotted grate, mesh grill, screen, or other means for securing the envelope within the housing while allowing free flow of fluid through the housing.

Commercial or municipal water treatment devices may include larger filter devices or tanks designed to attach to large high flow water pipes that provide beds positioned to receive water from a natural source during treatment. Such devices are well known in the art and the low contact pH activated carbon can be included in any such device. In various embodiments, beds or tanks including granular activated carbon can be positioned at various places along the flow path of the treatment plant, and granular low contact pH activated carbon as described above can be used by any one or all of these beds or tanks. In certain embodiments, the water may be contacted with powdered activated carbon at one or more place in the treatment path, and in such embodiments, the powdered activated carbon may be low contact pH activated carbon. As discussed above, in such treatment devices, the granulated or powdered low contact pH activated carbon can be low contact pH activated carbon and can be used alone or in a mixture of low contact pH activated carbon and neutral activated carbon. The treatment devices and facilities may include various additional tanks and components, such as, for example, equalization basins, clarifiers, biological treatment basins or tanks, sand filtration devices, membrane filtration devices, and the like and combinations thereof.

Further embodiments are directed to methods for purifying water using the low contact pH activated carbon described above. The step of contacting can be carried out by any means including, for example, flowing water over a bed of low contact pH activated carbon or mixture of low contact pH activated carbon and neutral activated carbon, introducing water onto a filter including low contact pH activated carbon or a mixture of low contact pH activated carbon and neutral pH activated carbon, introducing activated carbon having a low contact pH activated carbon or mixture of low contact pH activated carbon and neutral activated carbon into a container for holding water, and the like, and in some embodiments, such mean for contacting can be combined. In other embodiments, the method may include additional steps. For example, in some embodiments, methods for purifying water may include the steps of filtering the water using, for example, a screen or sand filter before, after, or both before and after contacting with low contact pH activated carbon or mixture of low contact pH activated carbon and neutral activated carbon to remove particulates. In further embodiments, the methods may include the step of disinfecting the water to remove biological contaminants such as bacteria or other microorganisms, and in some embodiments, the methods may include the step of introducing a disinfectant into the water. In still further embodiments, the methods may include the step of clarifying the water, adjusting the pH of the water, and the like and combinations thereof.

Although the present invention has been described in considerable detail with reference to certain preferred embodiments thereof, other versions are possible. Therefore the spirit and scope of the appended claims should not be limited to the description and the preferred versions contained within this specification. Various aspects of the present invention will be illustrated with reference to the following non-limiting examples.

EXAMPLE 1

Activated carbon samples prepared from various coal sources were washed in an acid bath containing about 1% to about 3% Hydrochloric acid. A portion of this acid washed activated carbon was neutralized with sodium carbonate to neutralize the pH of the activated carbon, then rinsed with water. A second portion of the acid washed activated carbon was acid washed and minimally rinsed with water to remove residual acid but was not neutralized, providing an activated carbon material having a low contact pH. Both samples were oven dried in shallow pans.

The neutralized activated carbon and the low contact pH activated carbon were tested for leaching of arsenic, antimony, and aluminum when immersed in water using the following procedure: A 50 cc sample of the activated carbon was placed into a beaker. 125 milliliters of purified water was introduced into the beaker slowly to ensure that all of the carbon was completely wetted and no air bubbles remained in the beaker, the carbon was stirred with a glass rod. The beaker was then covered and allowed to stand for 6 hours at room temperature. After 6 hours, the water was removed from the beaker and filtered. The filtrate was again filtered using a 0.8 µm syringe filter, and the water collected was preserved by acidifying with 1:1 nitric acid to a pH of less than 2. Samples were tested using inductively coupled plasma (ICP) spectrometry or inductively coupled plasma mass spectrometry (ICP-MS) to determine the concentration of various metals in the samples. Results are provided in TABLE 1.

| Final Rinse Step in Acid Wash Process | Leaching Performance | | | pH of Final Rinse | Final Contact pH |
|---|---|---|---|---|---|
| | Arsenic ppb | Antimony ppb | Aluminum ppb | | |
| Neutral | 28.4 | 30.5 | 15.3 | 6.58 | 9.86 |
| Low pH | <1 | <2 | <9.7 | 1.87 | 8.36 |
| Low pH | <1 | <2 | <9.7 | 1.70 | 7.04 |
| Low pH | <1 | <2 | <9.7 | 1.88 | 6.53 |

These data show the comparison of leaching characteristics of neutral and low pH carbons. The pH of the final rinse and the contact pH of the dried carbon is also shown. For carbons with a final rinse pH of 1-3 resulting in a contact pH of 6.5-8.5, there is a significant reduction in arsenic, antimony and aluminum to the limit of detection.

What is claimed is:

1. A composition comprising activated carbon having a contact pH of about 5.0 to about 8.5 and a final rinse water pH of about 1.0 to about 3.0.

2. The composition of claim 1, wherein the activated carbon has a contact pH of about 6.5 to about 8.0.

3. The composition of claim 1, wherein the activated carbon is derived from a source of carbon selected from the group consisting of bituminous coal, sub-bituminous coal, lignite coal, anthracite coal, peat, nut shells, pits, coconut, babassu nut, macadamia nut, dende nut, peach pit, cherry pit, olive pit, walnut shell, wood, polymers, resins, petroleum pitches, and combinations thereof.

4. The composition of claim 1, wherein the activated carbon has a mean particle diameter of about 4 mm to about 0.1 mm.

5. The composition of claim 1, further comprising activated carbon having a contact pH of greater than 8.0.

6. A method for treating water comprising contacting activated carbon having a contact pH of about 5.0 to about 8.5 and a final rinse water pH of about 1.0 to about 3.0 with water.

7. The method of claim 6, wherein contacting is selected from the group consisting of flowing water over a bed of the activated carbon, introducing water onto a filter including the activated carbon, introducing the activated carbon into a container for holding water, and combinations thereof.

8. The method of claim 6, further comprising one or more steps selected from the group consisting of filtering the water, disinfecting the water, clarifying the water, adjusting a pH of the water, and combinations thereof.

9. The method of claim 6, wherein the activated carbon has a contact pH of about 6.5 to about 8.0.

10. The method of claim 6, wherein the activated carbon has a mean particle diameter of about 4 mm to about 0.1 mm.

11. The method of claim 6, further comprising activated carbon having a contact pH of greater than 8.0.

12. A method for producing activated carbon comprising:
washing activated carbon in acid;
rinsing the activated carbon in water to a rinse water pH of about 1.0 to about 3.0; and
drying the activated carbon.

13. The method of claim 12, wherein the method further comprises partially neutralizing the acid before washing.

14. The method of claim 13, wherein the pH neutralizer is a base selected from the group consisting of sodium hydroxide, sodium carbonate, sodium bicarbonate, potassium hydroxide, potassium carbonate, potassium bicarbonate, and combinations thereof.

15. The method of claim 12, wherein washing in acid comprises immersing the activated carbon in an acid selected from the group consisting of hydrochloric acid, sulfuric acid, nitric acid, acetic acid, citric acid, maleic acid, fumaric acid, mono-basic organic acid, di-basic organic acid, and formic acid.

* * * * *